United States Patent
Heertjes et al.

(10) Patent No.: US 7,453,228 B2
(45) Date of Patent: Nov. 18, 2008

(54) METHOD FOR CONTROLLING A POSITIONING DEVICE, POSITIONING DEVICE, AND LITHOGRAPHIC APPARATUS PROVIDED WITH A POSITIONING DEVICE

(75) Inventors: Marcel François Heertjes, Best (NL); Yin Tim Tso, Eindhoven (NL); Ramidin Izair Kamidi, Eindhoven (NL); Dennis Andreas Petrus Hubertina Houben, Maastricht (NL)

(73) Assignees: ASML Netherlands B.V., Veldhoven (NL); Koninklijke Philips Electronics, Eindhoven (NL)

( * ) Notice: Subject to any disclaimer, the term of this patent is extended or adjusted under 35 U.S.C. 154(b) by 198 days.

(21) Appl. No.: 11/399,589

(22) Filed: Apr. 7, 2006

(65) Prior Publication Data

US 2007/0236163 A1  Oct. 11, 2007

(51) Int. Cl.
*G05B 5/01* (2006.01)
(52) U.S. Cl. .................. 318/619; 318/135; 318/560; 318/609; 318/632
(58) Field of Classification Search .......... 318/560, 318/561, 567, 609, 608, 610; 355/53, 75; 702/150
See application file for complete search history.

(56) References Cited

U.S. PATENT DOCUMENTS

| | | | | |
|---|---|---|---|---|
| 4,243,922 A | * | 1/1981 | Sobotta | 318/561 |
| 4,282,469 A | * | 8/1981 | Moriyama | 318/619 |
| 4,647,826 A | * | 3/1987 | Ota | 318/561 |
| 4,827,202 A | * | 5/1989 | Kurz et al. | 318/608 |
| 5,371,450 A | * | 12/1994 | Hiraoka | 318/560 |
| 5,481,914 A | * | 1/1996 | Ward | 73/504.16 |
| 5,714,831 A | * | 2/1998 | Walker et al. | 310/316.01 |
| 5,714,860 A | * | 2/1998 | Makinouchi | 318/561 |
| 5,757,149 A | * | 5/1998 | Sato et al. | 318/135 |
| 5,867,522 A | * | 2/1999 | Green et al. | 372/99 |
| 5,900,707 A | * | 5/1999 | Wakui | 318/625 |
| 5,940,789 A | * | 8/1999 | Yuan | 702/150 |
| 5,994,864 A | * | 11/1999 | Inoue et al. | 318/568.2 |
| 6,414,857 B2 | * | 7/2002 | Motoori | 363/41 |
| 6,815,947 B2 | * | 11/2004 | Scheiner et al. | 324/230 |
| 2001/0015901 A1 | * | 8/2001 | Motoori | 363/41 |
| 2003/0179359 A1 | * | 9/2003 | Korenaga | 355/75 |
| 2006/0203216 A1 | * | 9/2006 | Kwan et al. | 355/53 |
| 2007/0164697 A1 | * | 7/2007 | Cox et al. | 318/701 |
| 2007/0182944 A1 | * | 8/2007 | Van De Biggelaar | 355/53 |

* cited by examiner

*Primary Examiner*—Paul Ip
(74) *Attorney, Agent, or Firm*—Sterne, Kessler, Goldstein & Fox P.L.L.C

(57) ABSTRACT

In a method for controlling a positioning device, the positioning device has a stator and mover, the mover being movable relative to the stator; a position sensor configured to generate a position signal indicative of a position of the mover relative to the stator; a controller configured to receive the position signal, compare it to a setpoint signal to obtain an error signal, and generate a mover control signal on the basis of a signal component of the position signal, the controller having a variable gain. The positioning device, including the position sensor and the controller, defines a control loop. For error signals having a magnitude in a predefined range, the gain is selectively set to a value higher than a value for error signals having a magnitude outside the range.

16 Claims, 3 Drawing Sheets

METHOD FOR CONTROLLING A POSITIONING DEVICE, POSITIONING DEVICE, AND LITHOGRAPHIC APPARATUS PROVIDED WITH A POSITIONING DEVICE

BACKGROUND OF THE INVENTION

1. Field of the Invention

The present invention relates to a method for controlling a positioning device, a positioning device, and a lithographic apparatus provided with a positioning device.

2. Description of the Related Art

A lithographic apparatus is a machine that applies a desired pattern onto a substrate, usually onto a target portion of the substrate. A lithographic apparatus can be used, for example, in the manufacture of integrated circuits (ICs). In such a case, a patterning device, which is alternatively referred to as a mask or a reticle, may be used to generate a circuit pattern to be formed on an individual layer of the IC. This pattern can be transferred onto a target portion (e.g. including part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Conventional lithographic apparatus include steppers, in which each target portion is irradiated by exposing an entire pattern onto the target portion at once, and scanners, in which each target portion is irradiated by scanning the pattern through a radiation beam in a given direction (the "scanning" direction) while synchronously scanning the substrate parallel or anti-parallel to this direction. It is also possible to transfer the pattern from the patterning device to the substrate by imprinting the pattern onto the substrate.

A lithographic apparatus includes various moving parts that are positioned using at least one positioning device such as a linear or rotating motor. In a lithographic apparatus, examples of moving parts are a wafer stage, a reticle stage, a handler (robot arm), etc. A wafer stage may include different positioning devices for moving a wafer support in multiple degrees of freedom to desired positions with a desired speed, acceleration, etc. Likewise, a reticle stage may include different positioning devices for moving a reticle support in multiple degrees of freedom to desired positions with a desired speed, acceleration, etc.

A positioning device includes a first part, called a stator, which is stationary relative to a predefined frame of reference, and further includes a second part, called a mover, which moves relative to the stator through the generation of electromagnetic forces between the stator and the mover. Positioning the mover relative to the stator is performed using a controller. The controller may include a control characteristic being any combination of a proportional (P) control function, an integrating (I) control function, and a differentiating (D) control function.

For controlling the actuator by the controller, the controller receives a position signal from a position sensor detecting the position of the mover relative to the stator. The position signal is compared with a setpoint signal defining the desired position of the mover relative to the stator. The difference between the position signal and the setpoint signal is obtained as one or more error signals, and on the basis of the one or more error signals, the controller generates positioning device control signals for controlling the position and movement of the positioning device such as to reduce or eliminate position errors. This method of control is also referred to as feedback control, since the actual mover position is fed back to a controller input to generate the one or more error signals. The feedback control forms a closed loop.

In the process of generating positioning device control signals, the controller shows a control characteristic, which is a feature of the controller. The control characteristic is the way in which the controller operates in response to detecting position errors.

During motion of the mover of the positioning device, such as motion of the mover of a wafer stage or a reticle stage, low-frequency disturbances limit the closed-loop performance. Under linear feedback, additional low-frequency disturbance rejection can improve upon this performance, for example by increasing the integrator control function gain. A problem, however, is that the settling behavior at the start of a constant velocity range is deteriorated by increasing the integrator control function gain.

Generally, a problem in adequately handling time-varying disturbances is that in a certain time period a controller with a specific control characteristic related to the disturbance spectrum in this time period is required, whereas in another time period this spectrum generally changes, and therefore a different control characteristic is required.

In the state of the art, it has been proposed to change the gain of the controller depending on the type of disturbance experienced. However, changing the control characteristic to obtain a better handling of disturbances having one disturbance spectrum may seriously affect the controller's capability to handle a disturbance of another kind.

SUMMARY OF THE INVENTION

It is desirable to provide a positioning method and device, in particular for a lithographic apparatus, but not limited to such use, which show an improved performance in one frequency range without seriously affecting the performance in another frequency range.

According to an embodiment of the invention, a method for controlling a positioning device is provided, the positioning device including a stator and mover, the mover being movable relative to the stator; a position sensor configured to generate a position signal indicative of a position of the mover relative to the stator; a controller configured to receive the position signal, compare it to a setpoint signal to obtain an error signal, and generate a mover control signal on the basis of a signal component of the position signal, wherein the controller has a variable gain, and the positioning device, including the position sensor and the controller, defines a control loop, the method including, for error signals having a magnitude in a predefined range, selectively setting the gain to a value higher than a value for error signals having a magnitude outside the range. Here, the magnitude is defined as an absolute value of the error signal.

According to an embodiment of the invention, there is provided a positioning device including a stator and mover, the mover being movable relative to the stator; a position sensor configured to generate a position signal indicative of a position of the mover relative to the stator; a controller configured to receive the position signal, compare it to a setpoint signal to obtain an error signal, and generate a mover control signal on the basis of a signal component of the position signal, wherein the controller has a variable gain, the positioning device, including the position sensor and the controller, defines a control loop, the controller further being configured, for error signals having a magnitude in a predefined range, to selectively set the gain to a value higher than a value for error signals having a magnitude outside the range.

According to an embodiment of the invention, the positioning device is part of a lithographic apparatus.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
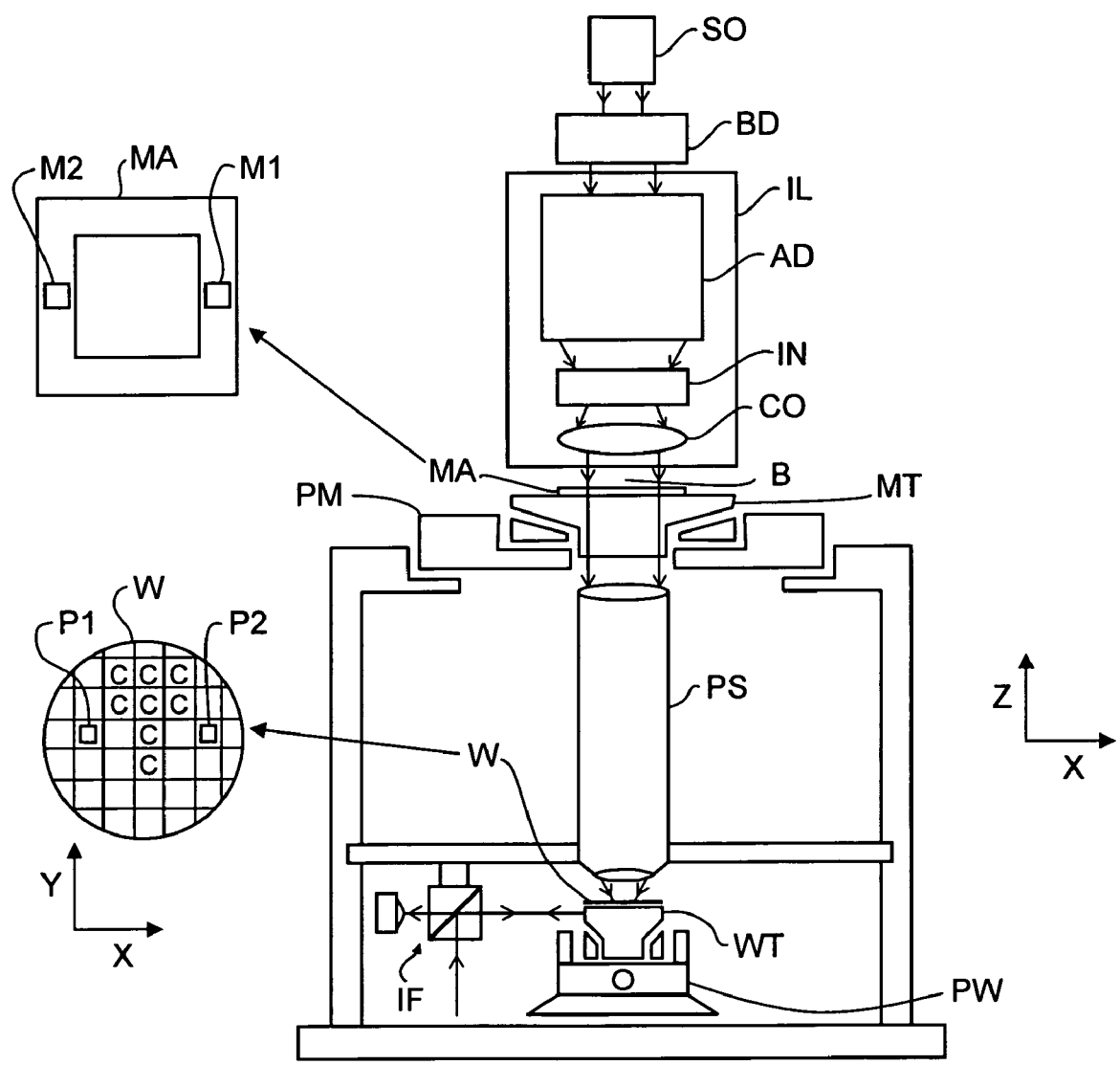
FIG. 1 depicts a lithographic apparatus according to an embodiment of the invention.

FIG. 1 schematically depicts a lithographic apparatus according to one embodiment of the invention. The apparatus includes an illumination system (illuminator) IL configured to condition a radiation beam B (e.g. UV radiation or any other suitable radiation), a mask support (e.g. a mask table) MT configured to support a patterning device (e.g. a mask) MA and connected to a first positioning device PM including at least one stator and mover, configured to accurately position the patterning device in accordance with certain parameters. The apparatus also includes a substrate table (e.g. a wafer table) WT or "substrate support" configured to hold a substrate (e.g. a resist-coated wafer) W and connected to a second positioning device PW including at least one stator and mover, configured to accurately position the substrate in accordance with certain parameters. The apparatus further includes a projection system (e.g. a refractive projection lens system) PS configured to project a pattern imparted to the radiation beam B by patterning device MA onto a target portion C (e.g. including one or more dies) of the substrate W.

The illumination system may include various types of optical components, such as refractive, reflective, magnetic, electromagnetic, electrostatic or other types of optical components, or any combination thereof, to direct, shape, and/or control radiation.

The mask support supports, e.g. bears the weight of, the patterning device. It holds the patterning device in a manner that depends on the orientation of the patterning device, the design of the lithographic apparatus, and other conditions, such as for example whether or not the patterning device is held in a vacuum environment. The mask support can use mechanical, vacuum, electrostatic or other clamping techniques to hold the patterning device. The mask support may be a frame or a table, for example, which may be fixed or movable as required. The mask support may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section so as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables or "substrate supports" (and/or two or more mask tables or "mask supports"). In such "multiple stage" machines the additional tables or supports may be used in parallel, or preparatory steps may be carried out on one or more tables or supports while one or more other tables or supports are being used for exposure.

The lithographic apparatus may also be of a type wherein at least a portion of the substrate may be covered by a liquid having a relatively high refractive index, e.g. water, so as to fill a space between the projection system and the substrate. An immersion liquid may also be applied to other spaces in the lithographic apparatus, for example, between the mask and the projection system. Immersion techniques can be used to increase the numerical aperture of projection systems. The term "immersion" as used herein does not mean that a structure, such as a substrate, must be submerged in liquid, but rather only means that a liquid is located between the projection system and the substrate during exposure.

Referring to FIG. 1, the illuminator IL receives radiation from a radiation source SO. The source and the lithographic apparatus may be separate entities, for example when the source is an excimer laser. In such cases, the source is not considered to form part of the lithographic apparatus and the radiation is passed from the source SO to the illuminator IL with the aid of a beam delivery system BD including, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may include an adjuster AD configured to adjust the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may include various other components, such as an integrator IN and a condenser CO. The illuminator may be used to condition the radiation beam, to have a desired uniformity and intensity distribution in its cross-section.

The radiation beam B is incident on the patterning device (e.g., mask MA), which is held on the mask support (e.g., mask table MT), and is patterned by the patterning device. Having traversed the mask MA, the radiation beam B passes through the projection system PS, which focuses the beam onto a target portion C of the substrate W. With the aid of the second positioning device PW, a position sensor IF (e.g. an interferometric device, linear encoder or capacitive sensor), and a first controller the substrate table WT can be moved accurately, e.g. so as to position different target portions C in the path of the radiation beam B. Similarly, the first positioning device PM, another position sensor (which is not explicitly depicted in FIG. 1), and a second controller can be used to accurately position the mask MA with respect to the path of the radiation beam B, e.g. after mechanical retrieval from a mask library, or during a scan. In general, movement of the mask table MT may be realized with the aid of a long-stroke module (coarse positioning) and a short-stroke module (fine positioning), which form part of the first positioning device PM. Similarly, movement of the substrate table WT or "substrate support" may be realized using a long-stroke module and a short-stroke module, which form part of the second positioning device PW. In the case of a stepper (as opposed to a scanner) the mask table MT may be connected to a short-stroke actuator only, or may be fixed. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the mask MA, the mask alignment marks may be located between the dies.

The depicted apparatus could be used in at least one of the following modes:
1. In step mode, the mask table MT or "mask support" and the substrate table WT or "substrate support" are kept essentially stationary, while an entire pattern imparted to the radiation beam is projected onto a target portion C at one time (i.e. a single static exposure). The substrate table WT or "substrate support" is then shifted in the X and/or Y direction so that a different target portion C can be exposed. In step mode, the maximum size of the exposure field limits the size of the target portion C imaged in a single static exposure.
2. In scan mode, the mask table MT or "mask support" and the substrate table WT or "substrate support" are scanned synchronously while a pattern imparted to the radiation beam is projected onto a target portion C (i.e. a single dynamic exposure). The velocity and direction of the substrate table WT or "substrate support" relative to the mask table MT or "mask support" may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.
3. In another mode, the mask table MT or "mask support" is kept essentially stationary holding a programmable patterning device, and the substrate table WT or "substrate support" is moved or scanned while a pattern imparted to the radiation beam is projected onto a target portion C. In this mode, generally a pulsed radiation source is employed and the programmable patterning device is updated as required after each movement of the substrate table WT or "substrate support" or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

According to an embodiment of the present invention, a controller for a positioning device, such as the positioning device PM or PW, includes a variable gain where large error signals prior to the constant velocity operation of the positioning device induce a small additional gain, such that the controller has a similar settling behavior as in the conventional linear feedback control. From a different perspective, prior to the constant velocity operation of the positioning device, large setpoint accelerations induce large forces, and therefore challenge the linearity properties of the device components, such as amplifiers, motor, actuators, models, etc. Sufficiently large stability margins are required, corresponding to small gains.

However, when the error signals are small, e.g. at a constant velocity operation of the positioning device, an additional gain becomes large, and an improved low-frequency disturbance rejection is obtained. Or, from a different perspective, the stability margins may be chosen tighter. This is desirable when the controller is to control a mover which is to follow a specific setpoint profile. In a lithographic apparatus, such a mover may be exemplified by a substrate stage mover for movements in the plane of the substrate (x and y direction).

According to another embodiment of the present invention, a controller for a positioning device includes a variable gain where large error signals induce a larger additional gain than small error signals. This leads to an improved disturbance rejection, and is not aimed at a possibility to choose the stability margins tighter, as in the previous embodiment. In a lithographic apparatus, a controller according to the present embodiment may be exemplified by a substrate stage mover for movements at right angles to the plane of the substrate (z direction), where a setpoint profile plays a minor role.

Figure 2:
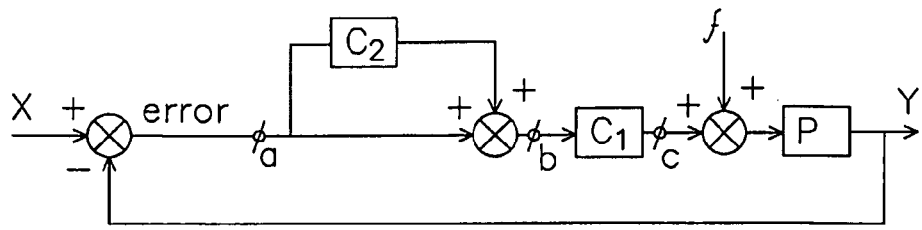
FIG. 2 depicts a block diagram of an embodiment of a controller according to the invention.

FIG. 2 illustrates a block diagram of a controller according to the present invention in simplified form, only depicting those components necessary for an understanding of its operation. A positioning device P (exemplified by the first positioning device PM and the second positioning device PW in FIG. 1) has a mover which is positioned at a position y. A position sensor (exemplified by a laser interferometer in FIG. 1) feeds back the position y to a comparator for comparison with a setpoint position x. The comparator outputs an error signal error which is input to a controller section C1. Additionally, a variable signal derived from the error signal is generated by controller section C2, and input to the controller section C1. An output of the controller section C1 is input to the positioning device P. Additionally, a signal f may be input to the positioning device P, e.g. representing disturbances which may act on the positioning device P, or feedforward contributions derived from a setpoint signal. Other disturbances, not indicated in FIG. 2, may also be input into the controller, such as output disturbances added to signal y, sensor noise added to signal y, etc.

Figure 3:
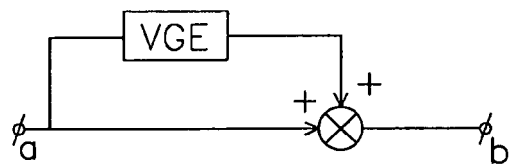
FIG. 3 depicts a block diagram of an embodiment of a part of the controller of FIG. 2.

FIG. 3 shows an embodiment of a part of the controller of FIG. 2 between terminals a and b. The controller section C2 includes a variable gain (non-linear) element VGE, as elucidated further with reference to FIGS. 4A and 4B.

Figure 4A:
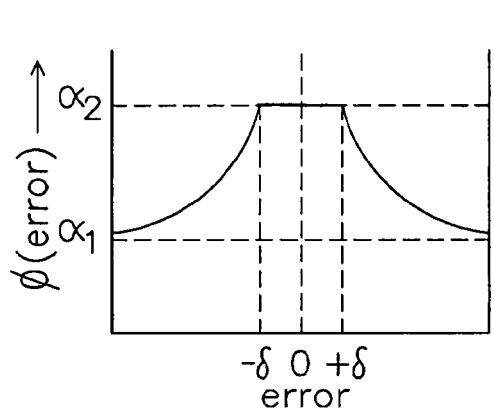
FIG. 4A depicts a variable gain curve in accordance with an embodiment of the invention.

FIG. 4A illustrates a variable gain φ of the part of the controller between terminals a and b as a function of the error, in a brief notation φ(error). The variable gain φ(error) varies between a first value $\alpha_1$, and a second value $\alpha_2$. The relationship shown in FIG. 4A may be mathematically described according to equations [1]:

if |error|≤δ, then φ(error)=$\alpha_2$ if |error|>δ, then φ(error)=$\alpha_1$+($\alpha_2$-$\alpha_1$)*δ/|error|     [1]

wherein:
|error| is the absolute value of the error
δ is a threshold
φ(error) is the variable gain
$\alpha_1$ is a lower gain value
$\alpha_2$ is a higher gain value.

In FIG. 4A, it can be seen that the variable gain φ(error) is large (in the example shown: $\alpha_2$=3) for small error levels, and small (in the example shown: $\alpha_1$ approaching 1) for large error levels. It is to be noted that the non-linear shape of the variable gain curve is not limited to the given example. As an example, the variable gain φ(error) is depicted as a constant value for errors in the range between −δ and +δ, however, it may also vary as long as it remains higher than the variable gain φ(error) outside the range.

Figure 4B:
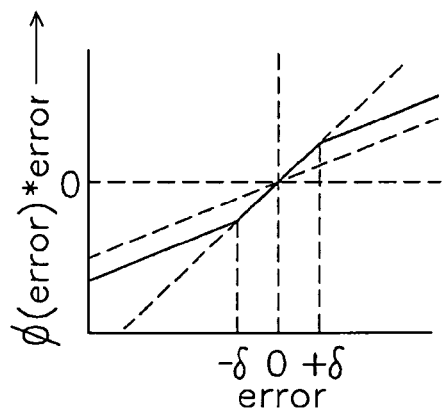
FIG. 4B depicts an input/output curve derived from FIG. 4A in accordance with an embodiment of the invention.

As can be mathematically demonstrated on the basis of absolute stability theory using the circle criterion, the static input-output relation (gain multiplied by input, i.e. φ(error) *error, as a function of error), as shown in FIG. 4B should be located in a sector delimited by sector boundaries, which are determined by $\alpha_1$ and $\alpha_2$. Further the gain curve should be memoryless: any input should have only one output. Finally, no discontinuities should be present in the gain curve.

Figure 4C:
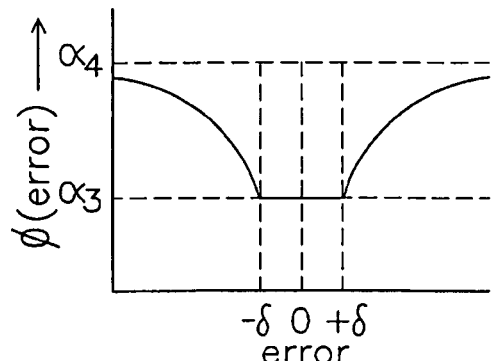
FIG. 4C depicts a variable gain curve in accordance with an embodiment of the invention.

FIG. 4C illustrates another variable gain φ(error) of the part of the controller between terminals a and b as a function of the error. The variable gain φ(error) varies between a first value $\alpha_3$ and a second value $\alpha_4$. The relationship shown in FIG. 4C may be mathematically described according to equations [2]:

if |error|≤δ, then φ(error)=$\alpha_3$ if |error|>δ, then φ(error)=$\alpha_4$-($\alpha_4$+$\alpha_3$)*δ/|error|     [2]

wherein:
|error| is the absolute value of the error
δ is a threshold
φ(error) is the variable gain
$\alpha_3$ is a lower gain value
$\alpha_4$ is a higher gain value.

In FIG. 4C, it can be seen that the variable gain φ(error) is large for large error levels, and small for small error levels. It is to be noted that the non-linear shape of the variable gain curve is not limited to the given example. In FIG. 4C, the variable gain φ(error) is depicted as a constant value for errors in the range between −δ and +δ, however, it may also vary as long as it remains lower than the variable gain φ(error) outside the range.

As explained above in relation to FIG. 4B, for the variable gain illustrated in FIG. 4C on the basis of absolute stability theory using the circle criterion, the static input-output relation (gain multiplied by input, i.e. φ(error)*error, as a function of error) should be located in a sector delimited by sector boundaries, which are determined by $\alpha_3$ and $\alpha_4$. Further the gain curve should be memoryless, and no discontinuities should be present in the gain curve.

It should be understood that the structure of the controller according to the invention may be varied. In particular, the location of the variable gain element VGE in the controller may vary. As a further example, reference is made to FIG. 5.

Figure 5:
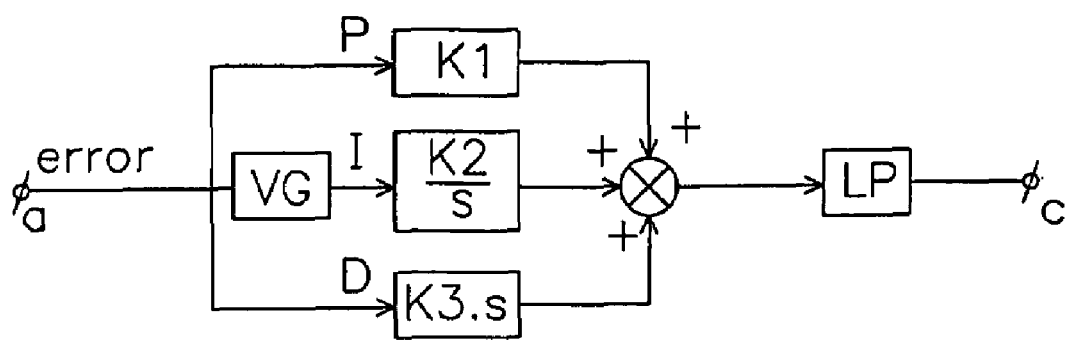
FIG. 5 depicts a block diagram of an embodiment of a part of the controller of FIG. 2.

FIG. 5 shows an embodiment of a part of the controller of FIG. 2 between terminals a and c including a nonlinear, variable gain element VG. The controller part includes a PID control structure where an error signal is input to a proportional section P, an integrating section I, and a differentiating section D. The proportional section P has a gain K1, the integrating section I has a gain K2 and a variable gain VG, and the differentiating section has a gain K3. The combined outputs of the proportional section P, the integrating section I and the differentiating section D are input to a low pass controller section LP. According to the present invention, the integrator gain is scaled non-linearly by a non-linear variable gain element VG using equations [1] above. Also in this embodiment, the location of the variable gain element is exemplary only, and not restricted to the integrating section I. The variable gain element may also be implemented in the proportional section P and/or the differentiating section D, or upstream of the PID control structure.

In experiments, it was found that the variable gain control according to the invention may provide an improved low-frequency disturbance rejection virtually without a deterioration of a settling behavior at a beginning of a constant velocity operation of a positioning device. In terms of a moving average (MA) performance of a positioning device, an order improvement was obtained, while in terms of a moving standard deviation (MSD) performance only a slight deterioration resulted in comparison with traditional controller settings.

Figure 6:
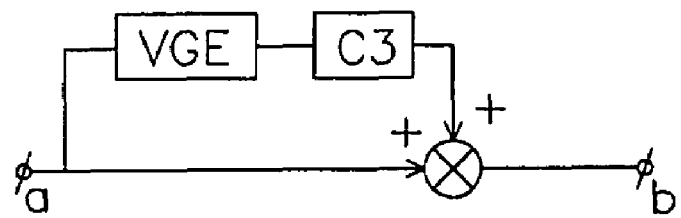
FIG. 6 depicts a block diagram of an embodiment of a part of the controller of FIG. 2.

FIG. 6 shows a further embodiment of a part of the controller of FIG. 2 between terminals a and b. The controller section C2 now includes a variable gain (non-linear) element VGE (cf. FIG. 3), supplemented with a dynamic filter C3. When the transfer function of the filter C3 is set equal to one, then the same situation as in FIG. 3 arises.

In an embodiment, C3 is chosen to represent an integrator, for example having the transfer function:

$$C3(s)=(s+\omega_i)/(s+\omega_i/n)$$

with $\omega_i$ represening the integrator cut-off frequency, and n determining a lag cut-off frequency $\omega_i$/n. Typically, n is set at n=1000.

In another embodiment, C3 is chosen to represent a higher-order filter structure. Such a filter structure may include a low-pass filter LP and at least one notch filter N (further notch filters may be added), for example having the transfer function:

$$C3(s)=LP(s)*N(s)$$

where $LP(s)=\omega_{1p}^2/(s^2+2*b_{1p}*\omega_{1p}*s+\omega_{1p}^2)$ $N(s)=\omega_2^2/\omega_1^2*(s^2+2*b_1*\omega_1*s+\omega_1^2)/(s^2+2*b_2*\omega_2*s+\omega_2^2)$ $\omega_{1p}$ low-pass frequency
$b_{1p}$ damping low-pass frequency
$\omega_1$ zero frequency
$b_1$ damping zero frequency
$\omega_2$ pole frequency $b_2$ damping pole frequency It has been demonstrated in experiments that the combination of the variable gain element VGE and the dynamic filter C3, which combination may be considered to represent a variable integrator, provides much more low-frequency controller effort (hence much more low-frequency disturbance rejection) in comparison with the sole implementation of a variable gain as discussed above with reference to FIGS. 3-5.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc. It should be appreciated that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g. having a wavelength of or about 365, 248, 193, 157 or 126 nm) and extreme ultra-violet (EUV) radiation (e.g. having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

While specific embodiments of the invention have been described above, it will be appreciated that the invention may be practiced otherwise than as described.

In the above, the present invention has been explained with reference to an embodiment of a lithographic apparatus. It should be appreciated that the invention can be applied to different kind of apparatus including motor devices for positioning an object. Examples of such different kind of apparatus are magnetic of optical storage devices, electron microscope imaging stages, and magnetic levitation stages for laser cutting.

In the above, the present invention has been explained with reference to block diagrams, which illustrate functional blocks of the positioning device according to the present invention. It should be appreciated that one or more of these functional blocks may be implemented in hardware, where the function of such functional block is performed by individual hardware components, but it is also possible that one or more of these functional blocks are implemented in software, so that the function of such functional block is performed by one or more sequences of machine-readable instructions, which may be executed on a computer system or programmable device such as a microprocessor, microcontroller, etc. to perform the controller function according to the invention. A data storage medium (e.g. semiconductor memory, magnetic or optical disk) may have such software stored therein, or such software may be provided through appropriate signals, either by wire or wireless.

The terms "a" or "an", as used herein, are defined as one or more than one. The term plurality, as used herein, is defined as two or more than two. The term another, as used herein, is defined as at least a second or more. The terms including and/or having, as used herein, are defined as including (i.e., open language). The term coupled, as used herein, is defined as connected, although not necessarily directly, and not necessarily mechanically. Software, a program, a computer program, or a software application may include a subroutine, a function, a procedure, an object method, an object implementation, an executable application, an applet, a servlet, a source code, an object code, a shared library/dynamic load library and/or other sequence of instructions designed for execution on a computer system.

The descriptions above are intended to be illustrative, not limiting. Thus, it will be apparent to one skilled in the art that modifications may be made to the invention as described without departing from the scope of the claims set out below.

What is claimed is:

1. A method for controlling a positioning device, the positioning device comprising a stator and mover, the mover being movable relative to the stator; a position sensor configured to generate a position signal indicative of a position of the mover relative to the stator; a controller configured to receive the position signal, compare it to a setpoint signal to obtain an error signal, and generate a mover control signal on the basis of a signal component of the position signal, the controller having a variable gain; the positioning device, including the position sensor and the controller are arranged in a control loop, the method comprising:

selectively setting the gain, for error signals having a magnitude in a predefined range, to a value higher than a value for error signals having a magnitude outside the range.

2. The method of claim 1, wherein the gain has a first value for error signals having a magnitude below a predefined threshold and, for error signals having a magnitude above the predefined threshold, the gain is decreased from the first value by a variable value.

3. The method of claim 2, wherein the first value is a constant.

4. The method of claim 2, wherein the gain is defined as:

if $|error| \leq \delta$, then $\phi(error) = \alpha_2$ if $|error| > \delta$, then $\phi(error) = \alpha_1 + (\alpha_2 - \alpha_1) * \delta / |error|$, wherein:
|error| is the absolute value of the error signal
$\delta$ is the threshold
$\phi(error)$ is the variable gain
$\alpha_1$ is a lower gain value
$\alpha_2$ is a higher gain value.

5. The method of claim 1, wherein the gain has a first value for error signals having a magnitude below a predefined threshold and, for error signals having a magnitude above the predefined threshold, the gain is increased from the first value by a variable value.

6. The method of claim 5, wherein the first value is a constant.

7. The method of claim 5, wherein the gain is defined as:

if $|error| \leq \delta$, then $\phi(error) = \alpha_3$ if $|error| > \delta$, then $\phi(error) = \alpha_4 - (\alpha_4 + \alpha_3) * \delta / |error|$ wherein:
$|error|$ is the absolute value of the error signal
$\delta$ is the threshold
$\phi(error)$ is the variable gain
$\alpha_3$ is a lower gain value
$\alpha_4$ is a higher gain value.

8. The method of claim 1, wherein the controller further comprises a dynamic filter.

9. The method of claim 8, wherein the dynamic filter has a transfer function:

$(s+\omega_i)/(s+\omega_i/n)$ with $\omega_i$ representing the filter cut-off frequency, and n determining a lag cut-off frequency $\omega_i/n$.

10. The method of claim 8, wherein the dynamic filter comprises a low-pass filter and a notch filter.

11. The method of claim 10, wherein the low-pass filter has a transfer function:

$\omega_{1p}^2/(s^2+2*b_{1p}*\omega_{1p}*s+\omega_{1p}^2)$ wherein:
$\omega_{1p}$ is a low-pass frequency
$b_{1p}$ is a damping low-pass frequency.

12. The method of claim 10, wherein the notch filter has a transfer function:

$\omega_2^2/\omega_1^2*(s^2+2*b_1*\omega_1*s+\omega_1^2)/(s^2+2*b_2*\omega_2*s+\omega_2^2)$ wherein:
$\omega_1$ is a zero frequency
$b_1$ is a damping zero frequency
$\omega_2$ is a pole frequency
$b_2$ is a damping pole frequency.

13. A positioning device, comprising:
a stator and mover, the mover being movable relative to the stator;
a position sensor configured to generate a position signal indicative of a position of the mover relative to the stator; and
a controller configured to receive the position signal, compare it to a setpoint signal to obtain an error signal, and generate a mover control signal on the basis of a signal component of the position signal, the controller having a variable gain, wherein the positioning device, including the position sensor and the controller arranged in a control loop, the controller further being configured, for error signals having a magnitude in a predefined range, to selectively set the gain to a value higher than a value for error signals having a magnitude outside the range.

14. A lithographic apparatus arranged to transfer a pattern from a patterning device onto a substrate, the lithographic apparatus comprising a positioning device for positioning part of the lithographic apparatus, the positioning device comprising:
a stator and mover, the mover being movable relative to the stator;
a position sensor configured to generate a position signal indicative of a position of the mover relative to the stator; and
a controller configured to receive the position signal, compare it to a setpoint signal to obtain an error signal, and generate a mover control signal on the basis of a signal component of the position signal, the controller having a variable gain, wherein the positioning device, including the position sensor and the controller arranged in a control loop, the controller further being configured, for error signals having a magnitude in a predefined range, to selectively set the gain to a value higher than a value for error signals having a magnitude outside the range.

15. A lithographic apparatus, comprising:
an illumination system configured to condition a radiation beam;
a patterning support configured to support a patterning device, the patterning device being configured to impart the radiation beam with a pattern in its cross-section to form a patterned radiation beam;
a substrate support configured to hold a substrate;
a projection system configured to project the patterned radiation beam onto a target portion of the substrate;
a positioning device for positioning at one of the patterning support and the substrate support, the positioning device comprising
a stator and mover, the mover being movable relative to the stator;
a position sensor configured to generate a position signal indicative of a position of the mover relative to the stator;
a controller configured to receive the position signal, comparing it to a setpoint signal to obtain an error signal, and generate a mover control signal on the basis of a signal component of the position signal, the controller having a variable gain, wherein the positioning device, including the position sensor and the controller arranged in a control loop, the controller further being configured, for error signals having a magnitude in a predefined range, to selectively set the gain to a value higher than a value for error signals having a magnitude outside the range.

16. A data carrier comprising a computer code representing machine-readable instructions that, when loaded in a computer system, cause the computer system to act as a controller to perform a method for controlling a positioning device, the positioning device comprising a stator and mover, the mover being movable relative to the stator; a position sensor configured to generate a position signal indicative of a position of the mover relative to the stator; a controller configured to receive the position signal, compare it to a setpoint signal to obtain an error signal, and generate a mover control signal on the basis of a signal component of the position signal, the controller having a variable gain; the positioning device, including the position sensor and the controller are arranged in a control loop, the method comprising:
selectively setting the gain, for error signals having a magnitude in a predefined range, to a value higher than a value for error signals having a magnitude outside the range.

* * * * *